April 23, 1963 F. J. BERNARD 3,086,627
MEANS FOR SUPPORTING PANELS, BARS, RODS AND THE LIKE
Filed May 8, 1959 2 Sheets-Sheet 1
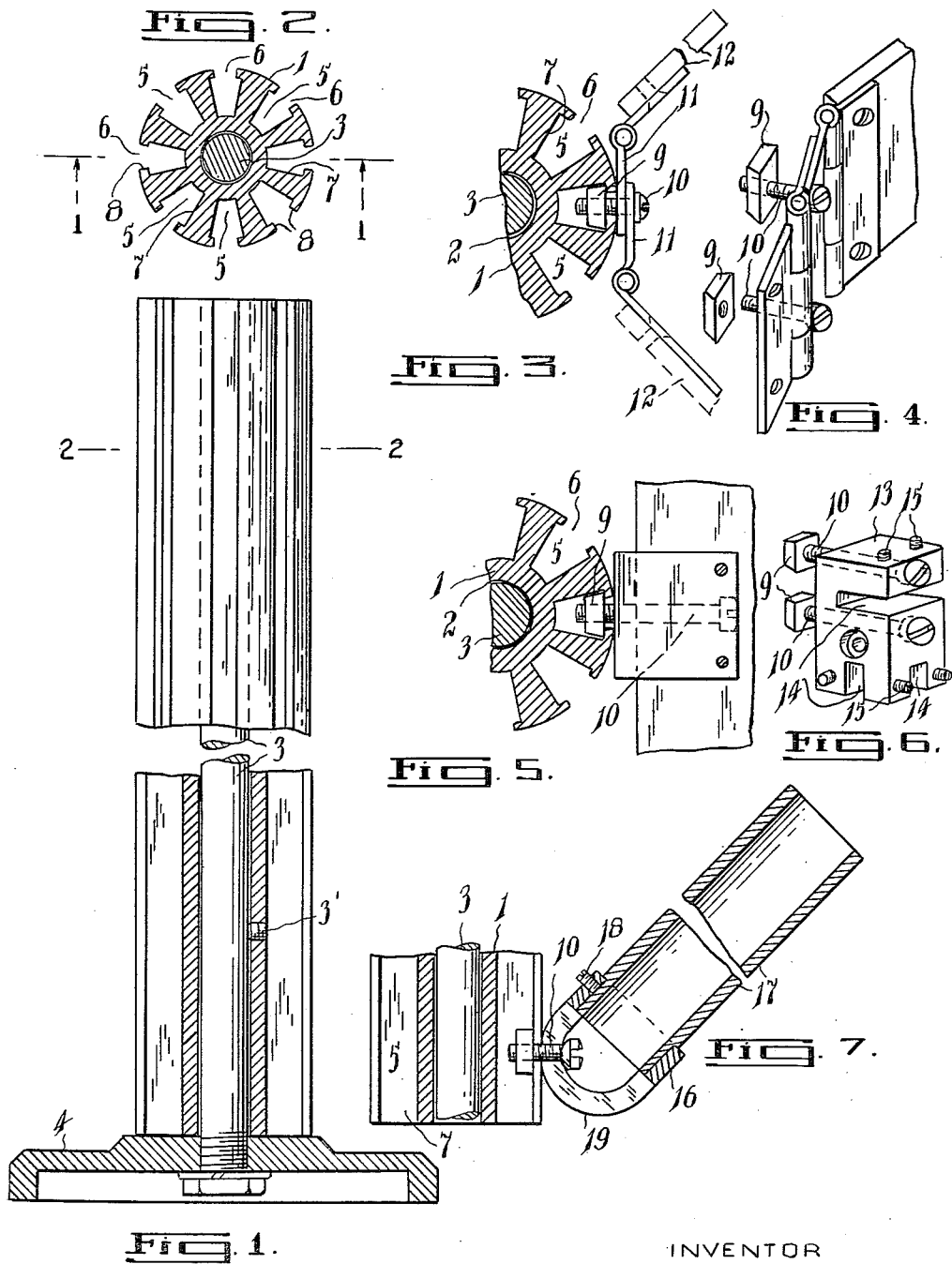
INVENTOR
Frank J. Bernard
ATTY.

April 23, 1963   F. J. BERNARD   3,086,627
MEANS FOR SUPPORTING PANELS, BARS, RODS AND THE LIKE
Filed May 8, 1959   2 Sheets-Sheet 2
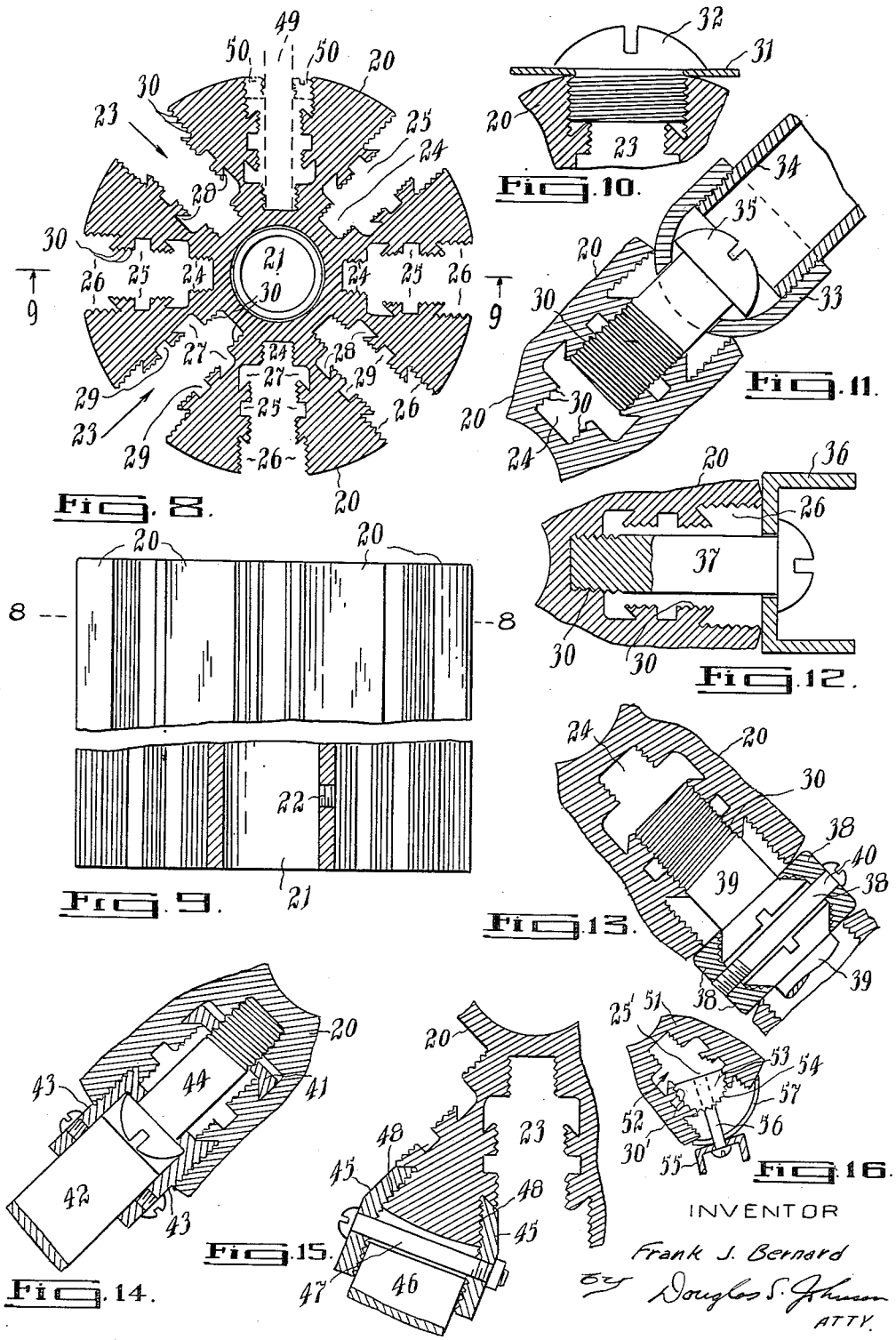
INVENTOR
Frank J. Bernard
By Douglas S. Johnson
ATTY.

United States Patent Office 3,086,627
Patented Apr. 23, 1963

3,086,627
MEANS FOR SUPPORTING PANELS, BARS, RODS AND THE LIKE
Frank J. Bernard, York County, Toronto, Ontario, Canada
Filed May 8, 1959, Ser. No. 811,919
Claims priority, application Canada May 10, 1958
13 Claims. (Cl. 189—38)

This invention relates to an improved means of adjustably supporting panels, bars, rods, pipes, wires or other structural elements at any desired angle, at any desired height, or with any desired orientation, the invention having application in the erecting of shelves, cases, tables, or other furniture, or in the erection of show displays, partitions, walls, ceilings, or any other structure or assembly involving the supporting of a structural element.

It is a further particular object to enable structural elements to be supported for adjustment about a support axis and further to be supported for adjustment along the support axis and for adjustment in different angular relations about the support axis so that the supported structural elements may be caused to assume substantially any orientation desired.

Another important object is to provide a high degree of versatility in the manner in which structural elements can be supported in desired positions.

According to the invention, the basic support element comprises a pole member of any desired cross-section, for instance, hexagonal, octagonal, square or round, having at least one longitudinal groove therein, which groove is formed to incorporate means capable of anchoring a structural member or a fitting for supporting a structural member in adjusted positions along the length of the groove. Further according to the invention, the pole member has a central bore therethrough to receive a support rod whereby the pole may be adjusted angularly or axially of the support rod.

According to one form of the invention, the pole groove is formed to present a longitudinal trackway to slidably receive one element of a clamp pair, the trackway opening to the exterior of the pole through a reduced passage or mouth through which the other element of the clamp pair is adapted to extend.

According to another form of the invention, the side walls of the pole groove are formed with thread defining ridges running longitudinally thereof for cooperation with a clamping bolt or screw. Further according to the invention, the pole groove may be stepped and the walls of each of the steps provided with thread defining ridges to enable clamping bolts or screws of different sizes to be threaded therein.

Another feature of the invention resides in providing support poles which can conveniently be clamped together and further, the provision of novel fittings adapted to cooperate with the poles and the clamping devices associated therewith.

These and other objects and features of the invention will become apparent from the following detailed description taken in conjunction with the accompanying drawings, in which:

FIGURE 1 is a part-elevational, part-vertical sectional view taken on the line 1—1 of FIGURE 2 of a pole constructed to embody one form of the invention, and mounted on the supporting post;

FIGURE 2 is a horizontal sectional view on the line 2—2 of FIGURE 1;

FIGURE 3 is a fragmentary horizontal sectional view illustrating the manner in which one form of structural member supporting fitting may be secured to the pole of FIGURES 1 and 2;

FIGURE 4 is a perspective view of the fitting illustrated in FIGURE 3;

FIGURE 5 is a view similar to FIGURE 3 but showing a different form of fitting;

FIGURE 6 is a perspective view of the fitting of FIGURE 5;

FIGURE 7 is a part-vertical sectional view illustrating the use of a different fitting with the pole structure of FIGURES 1 and 2;

FIGURE 8 is a horizontal sectional view of a modified form of pole structure taken on the line 8—8 of FIGURE 9;

FIGURE 9 is a part-elevational, part-vertical sectional view taken on the line 9—9 of FIGURE 8;

FIGURE 10 is a fragmentary horizontal sectional detail illustrating one way in which a structural member may be clamped to the pole of FIGURES 8 and 9;

FIGURES 11 and 12 are views similar to FIGURE 10, but illustrating alternative fittings for clamping structural members to the pole of FIGURES 8 and 9;

FIGURE 13 is a horizontal sectional detail illustrating a clamping device which may be utilized to couple a pair of poles corresponding to FIGURES 8 and 9 together;

FIGURE 14 is a view similar to FIGURE 10 illustrating another form of fitting or clamping device for connecting a structural member to the pole of FIGURE 8;

FIGURE 15 is a fragmentary horizontal sectional view illustrating an alternative arrangement for clamping a structural member to the pole of FIGURE 8;

FIGURE 16 is a fragmentary horizontal sectional detail of an alternative form of pole structure illustrating a further fitting arrangement for attaching a structural member thereto.

Referring first to FIGURES 1 to 7, the pole 1 is shown as being generally circular in cross-section and having a central axially extending bore 2 adapted to receive a post 3 which may be mounted in any suitable way such as by securement to a base plate 4. The pole 1 is provided with a plurality of longitudinally extending grooves 5 which open to the periphery of the pole through reduced throats 6. The side walls 7 of the grooves are thus, in effect, undercut beneath ledges 8 which define the throats 6. Thus, the grooves 5 constitute longitudinal trackways within which one element of a clamping pair may be slidably retained.

In the examples illustrated in FIGURES 3 to 7, the clamping pair is shown as comprising a clamp member 9 in the form of a nut and a cooperating clamp screw 10 which is adapted to extend through the throat of the groove in which the nut 9 is retained to threadably engage the nut. It will be understood, of course, that the arrangement may be readily reversed and that the head of the clamp screw or bolt 10 may be arranged to be slidably anchored within the respective groove 5 with the shank of the screw or bolt projecting out through the groove throat 5 for engagement with the nut 9.

The fitting illustrated in FIGURE 3 comprises a pair of hinges 11 clamped to the pole 1 by the clamping means comprising the nut 9 and clamp screw 10, and these hinges 11 carry structural members in the form of panels 12. It will be obvious that the whole assembly comprising the hinge members 11 and the panels 12 are slidably adjustable along the length of the pole to any desired position.

The fitting illustrated in FIGURES 5 and 6 comprises a clamp lock 13 having slots 14 therein adapted to receive a panel or other structural member which may be secured in position by set screws 15. The fitting illustrated in FIGURE 7 comprises a thimble-like member 16 having a slot therein to receive the shank of the clamp screw 10. This thimble 16 is adapted to receive a tube or like member 17 which may be secured in position by set screw 18.

It will be seen that the whole assembly comprising the fitting 16 and tube 17 can be slid longitudinally of the pole, and also, due to the rounded bottom surface 19 of the fitting 16, the tube 17 can be oriented in substantially any angular relation relative to the pole, and the pole, in turn, can be angularly and axially adjusted on the post 3 and clamped in position by set screw 3'.

FIGURES 8 to 15 illustrate an alternative pole designated at 20. Again, this pole has an axial bore 21 to enable the pole to be sleeved on a suitable supporting post, and a clamp screw 22 is provided to clamp the pole in angularly and axially adjusted positions on a support post. Again, the pole is shown as of generally circular cross-section, although it will be appreciated that it may have any other desired regular cross-section.

In the form illustrated, the pole is provided with a plurality of longitudinal axially extending grooves 23 which open radially outwardly to the periphery of the pole. Each of these grooves is shown as having a narrow inner portion 24, a wider intermediate portion 25, and a still wider outer portion 26. Thus, each of the grooves, in effect, is of a stepped formation. Between the inner step 24 and the intermediate step 25, the side walls of each groove 23 are laterally grooved as indicated as 27 to provide an undercut 28. The intermediate step 25 of each of the grooves also has the side walls thereof grooved as at 29. Further, the walls of each of the stepped portions 24, 25 and 26 of each of the grooves are provided with longitudinally extending ridge formations 30, the ridge formation on one side wall being staggered with respect to the ridge formation on the opposite side wall of each of the groove portions so that the ridge formations on such opposite walls form screw thread cooperating elements to facilitate attachment of structural members to the post, as hereinafter more fully described.

As shown in FIGURE 10, a plate 31 may be clamped to the pole by means of a large clamp screw 32 which engages with the screw cooperating ridge elements 30 of the outer widest stepped portion 26 of one of the grooves 23.

In FIGURE 11, a fitting 33 of thimble form corresponding to the fitting 16 of FIGURE 7, and in which a tube 34 is threadably engaged, is anchored to the pole 20 by means of bolt 35 engaging with the screw thread cooperating ridge formations 30 of the intermediate step of one of the grooves 23.

In FIGURE 12, a bracket 36 is secured to the pole 20 by means of a bolt 37 threadably engaging with the screw thread cooperating ridge formation 30 of the narrow inner stepped portion 24 of one of the grooves 23. It will be understood that the clamp screw 32 or bolts 35 and 37 may be anchored in the pole groove 23 at any desired point along the length of the groove, that is, at any height on the pole, but when tightened, will clamp the respective structural member or fitting firmly in position.

FIGURE 13 illustrates a convenient means of connecting two corresponding posts 20 together. To achieve this result, a pair of clamp plates 38 are arranged to connect the heads of clamping bolts 39, each of which is adapted to threadably engage in one of the grooves 23 of a pole 20. A clamp screw 40 is arranged to anchor the assembly comprising the clamp plates 38 and clamping bolts 39 together.

FIGURE 14 illustrates the use of a nut 41 which is arranged to engage beneath the undercut 28 of one of the grooves 23 to anchor a structural member in the form of a panel or plate 42 in adjusted positions on the pole. The panel 42 is engaged between clamp plates 43 which underlie the head of a clamping bolt 44 threadably engaging the nut 41. Alternatively, a nut could be slidably received in the grooves 29.

The above illustrations show the use of various fittings which are secured by means of bolts extending into a particular groove. FIGURE 15 illustrates the use of a pair of clamp plates 45 which are adapted to engage ridge formations 30 of adjoining grooves 23 for clamping a panel 46 to the pole. A clamp bolt 47 serves to secure the clamp plates 45 to the panel and to the pole, and it will be seen that the clamp plates 45 have cooperating ridge formations 48 engaging the ridge formations 30 of the pole grooves.

Shown in dotted line in FIGURE 8 is a panel 49 which is secured directly in one of the grooves 23 and is held there by anchoring set screws 50.

An alternative groove arrangement is illustrated in FIGURE 16 in which a pole designated at 51 is provided with at least one groove 52 generally corresponding to the groove 23, with the exception that the intermediate groove portion 25' is of part-circular shape. A part-circular nut 53 having ridge formations 54 thereon is adapted to cooperate with the ridge formations 30' of the groove portion 25' whereby the nut 53 is adapted to be located in adjusted positions within the groove 52.

A bracket 55 is secured to the pole by means of a clamping screw 56 which extends through the bracket and through a part-circular slotted bridge member 57, against which the bracket bears, and into the nut 53.

It will be understood that a pole according to the invention may be readily extruded of suitable material, for instance, aluminum or a suitable plastic material, and it will be appreciated that the precise form of the grooves may vary as desired, and that the fittings to be used with the pole may take many other forms besides those shown herein as illustrative of the invention without departing from the spirit of the invention or scope of the appended claims.

The embodiments of the invention in which an exclusive privilege or property is claimed are defined as follows.

I claim:

1. Support means for structural elements comprising; an elongate pole member having a main axis and at least one groove therein extending longitudinally thereof which groove opens to the outer surface of said pole member, said groove having stepped sidewalls presenting at least two steps of increased width outwardly from said axis, said side walls having longitudinal ridge formations at each of said steps.

2. Support means as claimed in claim 1 in which each of said grooves is of stepped formation and the walls of the groove steps are longitudinally ribbed to provide ridge means adapted to selectively co-operate with a screw threaded clamping member having a diameter corresponding to the width of the selected groove step.

3. Support means as claimed in claim 1 in which said pole member has a plurality of grooves therein, each of like cross-section.

4. Support means as claimed in claim 1 in which said ridge formations are offset to form screw thread co-operating ridge elements.

5. Support means as claimed in claim 1 in which each of the side walls of each of said grooves is formed intermediate of the depth thereof with a longitudinal laterally extending groove therein, said laterally extending grooves defining a trackway to slidably receive a clamping element.

6. Support means as claimed in claim 5 in which said pole member has a plurality of grooves therein, each of like cross-section.

7. In combination comprising, a structural element support means for said structural element, and means for clamping said structural element to said support means; said support means comprising, an elongate pole member having a main axis and a plurality of grooves therein, each of like cross-section, extending longitudinally thereof, which grooves open to the outer surface of said pole member, said grooves having stepped sidewalls presenting at least two steps of increased width outwardly from said axis, said sidewalls having longitudinal ridge formations at each of said steps, which ridge formations on opposite walls of each of said grooves are offset to form screw thread co-operating ridge elements.

8. Support means as claimed in claim 7 in which said clamping means comprises a clamping bolt.

9. Support means as claimed in claim 7 in which the structural element comprises a second corresponding pole, and said clamp means comprises a pair of clamp plates, and means for anchoring said clamp plates to second pole.

10. Support means as claimed in claim 7 in which said clamping means comprises a pair of clamp plates adapted to lockingly engage with said groove ridge formations at spaced points, and means for maintaining said clamping plates in engagement with said ridge formations.

11. In combination, an assembly comprising; a first support member, and a structural member disposed in an adjacent relationship; means extending from said support member toward said structural member, said means having a first surface and a second surface, each of said surfaces extending divergently outward with respect to each other from said support member toward said structural member; a clamp adapted to be secured to said structural member and engage said divergent sides of said means, said clamp comprising; a first plate; a second plate spaced apart from said first plate in an opposed relationship thereto; each of said first and second plates including a lateral portion having a surface inclined inwardly toward the inclined surface of the opposed plate and engageable with the adjacent divergent surface of said means, and adjustable means engageable with said first and second plates, whereby said clamp, said support and said structural members are brought into secure engagement.

12. The combination as claimed in claim 11, including means extending from said structural member toward said support member, which means includes divergent sides, said clamp being further characterized in including second lateral portions having surfaces inclined toward the opposed lateral portion and adapted to engage the adjacent divergent sides of said means.

13. The combination as claimed in claim 12 in which said structural member comprises a second support member corresponding to said first support member.

References Cited in the file of this patent
UNITED STATES PATENTS

| | | |
|---|---|---|
| Re. 24,133 | Bloedow | Mar. 20, 1956 |
| 1,545,456 | Rastetter | July 7, 1925 |
| 2,677,519 | Hobson | May 4, 1954 |
| 2,716,533 | Freeman | Aug. 30, 1955 |

FOREIGN PATENTS

| | | |
|---|---|---|
| 782,428 | Great Britain | Sept. 4, 1957 |